(12) United States Patent
Griswold et al.

(10) Patent No.: US 12,528,555 B2
(45) Date of Patent: Jan. 20, 2026

(54) DEVICES AND METHODS FOR PIEZOELECTRIC SENSING AND ENERGY HARVESTING ON WHEELS

(71) Applicant: TDK Corporation, Tokyo (JP)

(72) Inventors: Ryan Griswold, San Jose, CA (US); Vibhu Vivek, San Jose, CA (US)

(73) Assignee: TDK CORPORATION, Tokyo (JP)

( * ) Notice: Subject to any disclaimer, the term of this patent is extended or adjusted under 35 U.S.C. 154(b) by 310 days.

(21) Appl. No.: 18/142,504

(22) Filed: May 2, 2023

(65) Prior Publication Data

US 2023/0348009 A1 Nov. 2, 2023

Related U.S. Application Data

(60) Provisional application No. 63/337,337, filed on May 2, 2022.

(51) Int. Cl.
| | |
|---|---|
| G01M 17/02 | (2006.01) |
| B62J 45/423 | (2020.01) |
| G01B 7/16 | (2006.01) |
| H02N 2/18 | (2006.01) |

(52) U.S. Cl.
CPC ............. *B62J 45/423* (2020.02); *G01B 7/16* (2013.01); *H02N 2/186* (2013.01)

(58) Field of Classification Search
CPC .................................................... G01M 17/02
See application file for complete search history.

(56) References Cited

U.S. PATENT DOCUMENTS

| | | | | |
|---|---|---|---|---|
| 4,117,452 A | * | 9/1978 | Snyder | G01L 17/00 200/61.23 |
| 9,935,563 B2 | * | 4/2018 | Tatarchuk | B60C 23/041 |
| 2022/0134810 A1 | * | 5/2022 | Vivek | B29D 30/0061 152/152.1 |
| 2023/0133090 A1 | * | 5/2023 | Griswold | B60C 23/006 340/442 |

* cited by examiner

*Primary Examiner* — Eric S. McCall
(74) *Attorney, Agent, or Firm* — Morgan, Lewis & Bockius LLP (57) ABSTRACT

Sensor modules mountable on a wheel are described with methods of use. A sensor module for a wheel includes a base module mountable to a rim. The sensor module further includes a first set of piezoelectric sensors coupled to the base module at a first side and a second set of piezoelectric sensors coupled to the base module at a second side. A method includes receiving a first force from a tire on a piezoelectric sensor mounted on a rim, the force resulting from an inflation of the tire and causing a first strain on the sensor. The method further includes receiving a second force on the sensor corresponding to a deformation of the tire due to surface contact, where the second force causes a second strain. The method also includes generating wheel data from electrical signals produced by the sensor; and transmitting the wheel data to a remote device.

20 Claims, 11 Drawing Sheets

810 Receive a first force from a tire on a piezoelectric sensor mounted on a rim of a wheel. The first force results from an inflation of the tire and causes a first strain on the piezoelectric sensor.

812 Receive a second force from the tire on the piezoelectric sensor, the second force corresponding to a deformation of the tire due to contact with a surface. The second force causes a second strain on the piezoelectric sensor.

814 Generate electrical signals corresponding to the first and second strains on the piezoelectric sensor.

816 Generate wheel data from the electrical signals.

818 Transmit the wheel data to a remote device.

Figure 8

DEVICES AND METHODS FOR PIEZOELECTRIC SENSING AND ENERGY HARVESTING ON WHEELS

PRIORITY AND RELATED APPLICATIONS

This application claims priority to U.S. Provisional Patent Application No. 63/337,337, entitled "Devices and Methods for Piezoelectric Sensing and Energy Harvesting on Wheels" filed May 2, 2022, which is hereby incorporated by reference in its entirety.

TECHNICAL FIELD

This application relates generally to energy harvesters and strain sensors, and more particularly to energy harvesters and strain sensors with piezoelectric materials.

BACKGROUND

Bicycles, e-bikes, and other wheeled vehicles are popular means of transportation. Whether used for recreation, commuting, or competition, the vehicle needs to function well and be maintained. There is demand for improved safety, response, feedback, and rider analytics. Therefore, monitoring the performance and health of the tires and wheels, as well as the road and surface conditions, is important for riders. However, it can be challenging to mount and operate sensors to perform the monitoring.

SUMMARY

Important health and performance data can include tire behavior, pressure, direction, and speed, as well as temperatures and forces (static and dynamic) exerted on the tires, wheels, or vehicle. Some of the sensors used for these types of measurements include a piezoelectric material, which can be used to detect mechanical strain or deformation. For example, a sensor with piezoelectric material can provide electrical signals that contain information about the movement and/or deformation of a portion of an object (e.g., tire, wheel, vehicle, etc.) with which the sensor is in contact.

Among other things, the devices and methods described herein address challenges associated with conventional wheel and tire sensors. For example, a sensor module described herein includes piezoelectric components and electronics and is mountable to an inner wheel to interface with the tire to capture and wirelessly transfer analytics such as tire behavior, pressure, direction, force and speed. Additionally, the sensor module can generate usable power via piezoelectric energy harvesting for self-sustainment and/or distribution to other electronics and devices.

Placement of the sensor module on the wheel can impact the performance of the sensor module. For example, placement of a piezoelectric sensor on a tread (where large, complex deformation occurs) can be beneficial for energy generation, but detrimental to health and performance monitoring (e.g., difficult to deconvolute into the deformation into principal signals). Mounting the sensor to the rim of the wheel and configuring the sensor to contact the inner sidewall of the tire can promote deconvolution, particularly when using a dual piezoelectric structure to obtain differential signals. A dual piezoelectric structure can also improve energy output (e.g., when excited in-phase).

An example sensor module has a winged structure that includes dual, opposing, in-phase piezoelectric stack components that are coupled to the wheel and tire simultaneously. Mounting the example sensor module to the rim can bridge the rigidity of the wheel and the compliance of the rubber tire, allowing the sensors to detect the dynamic aspects of the tire as it contacts the ground. Additionally, having the piezoelectric stack components contact the inside tire (at both sides of the sidewall) allows the sensor module to discriminate force bias and extract wheel, tire, and surface characteristics. For example, as a wheel rotates, force is transferred from weight of the vehicle to the tire. As the tire bears this load, the sidewalls displace and the displacement can be transformed into strain of the piezoelectric stack components.

In accordance with some implementations, a piezoelectric component can also be configured as an energy-harvesting device, e.g., an electrical power generator that converts kinetic, thermal, optical, and/or mechanical energy available from a vehicle into electrical energy. The energy available from the vehicle can include rotation, acceleration, deceleration, and/or vibration of the wheels. Such an energy-harvesting device may replace conventional energy storage devices or, when used in conjunction, improve performance and/or prolong the life expectancy of the energy storage devices.

In accordance with some embodiments, a sensor module for a wheel includes: (i) a base module mountable to a rim of the wheel; (ii) a first set of piezoelectric sensors coupled to the base module at a first side; and (iii) a second set of piezoelectric sensors coupled to the base module at a second side, the second side opposite of the first side. In accordance with some embodiments, a wheel includes a rim and any sensor module described herein.

In accordance with some embodiments, a method includes: (i) receiving a first force from a tire on a piezoelectric sensor mounted on a rim of a wheel, the first force resulting from an inflation of the tire and causing a first strain on the piezoelectric sensor; (ii) receiving a second force from the tire on the piezoelectric sensor, the second force corresponding to a deformation of the tire due to contact with a surface, where the second force causes a second strain on the piezoelectric sensor; (iii) generating an electrical signal corresponding to a difference between the first and second strains on the piezoelectric sensor; (iv) generating wheel data based on the electrical signal; and (v) transmitting the wheel data to a remote device.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Reference will be made to embodiments, examples of which are illustrated in the accompanying drawings. In the following description, numerous specific details are set forth in order to provide a thorough understanding of the various described embodiments. However, it will be apparent to one of ordinary skill in the art that the various described embodiments may be practiced without these particular details. In other instances, methods, procedures, components, circuits, and networks that are well-known to those of ordinary skill in the art are not described in detail so as not to unnecessarily obscure aspects of the embodiments.

Figure 1A:
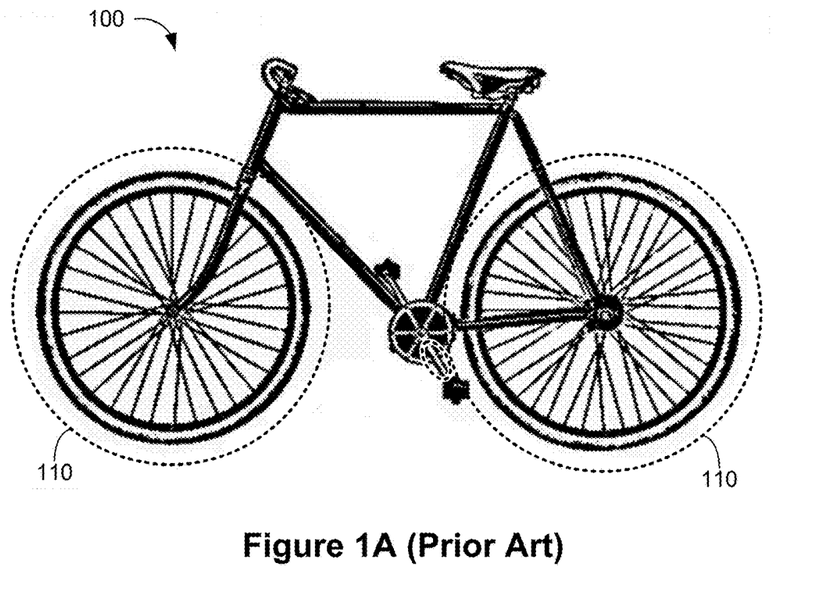
FIGS. 1A and 1B are schematic diagrams illustrating parts of a bicycle in accordance with some embodiments.

FIG. 1A is a schematic diagram illustrating parts of a bicycle 100 in accordance with some embodiments. Although the bicycle 100 is used as an example throughout this application, the piezoelectric devices described herein may be used in other wheeled vehicles and devices, such as an e-bike, automobile, motorcycle, scooter, roller skate, skateboard, or wheelbarrow.

Figure 1B:
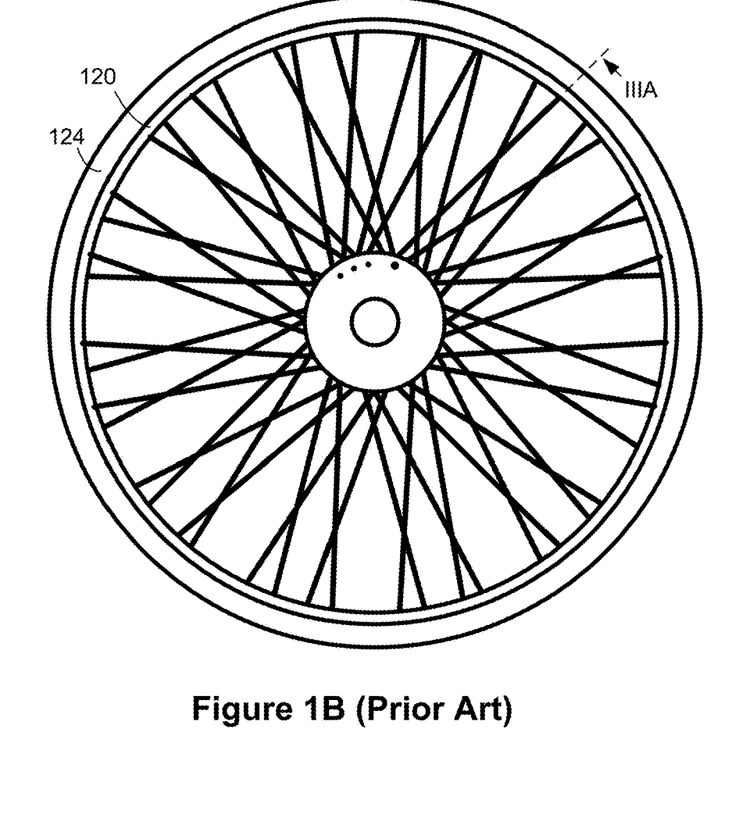

The bicycle 100 includes a frame and wheels 110 (e.g., in FIG. 1A, the bicycle 100 includes two wheels 110). The wheel 110 includes a rim 120 and a tire 124 mounted on the rim 120 as shown in FIG. 1B. The rim 120 is coupled with a plurality of spokes 122, which extend to a hub 140 of the wheel 110. In some embodiments, the spokes 122 are coupled to hub holes 142 (also called spoke holes) of the hub 140 (e.g., using a hub hook).

Figure 2A:
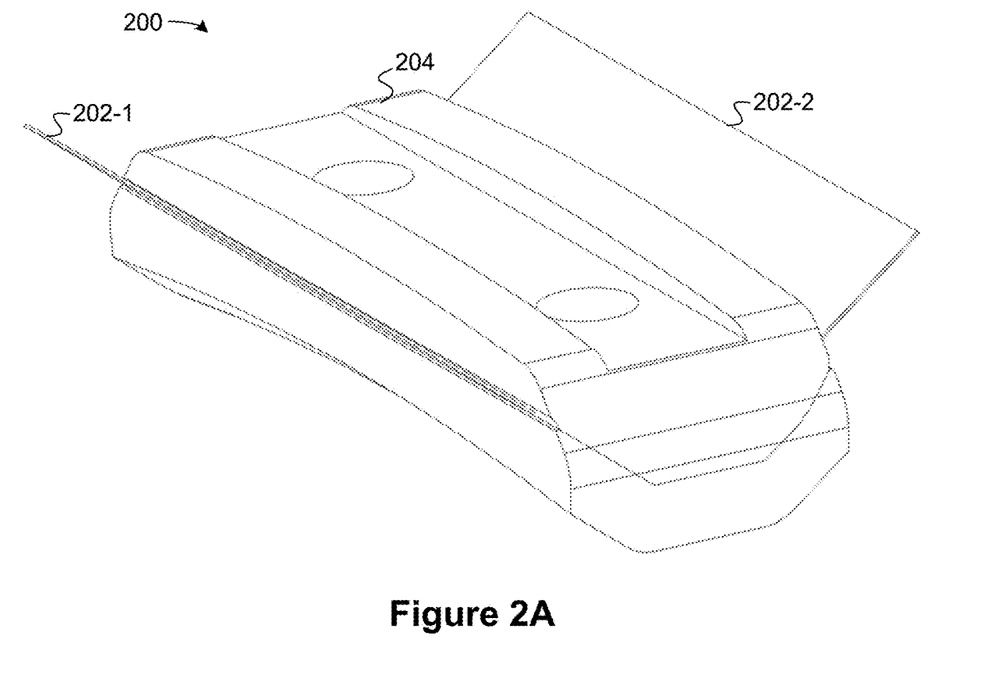
FIGS. 2A-2B illustrate an example sensor module in accordance with some embodiments.
Figure 2B:
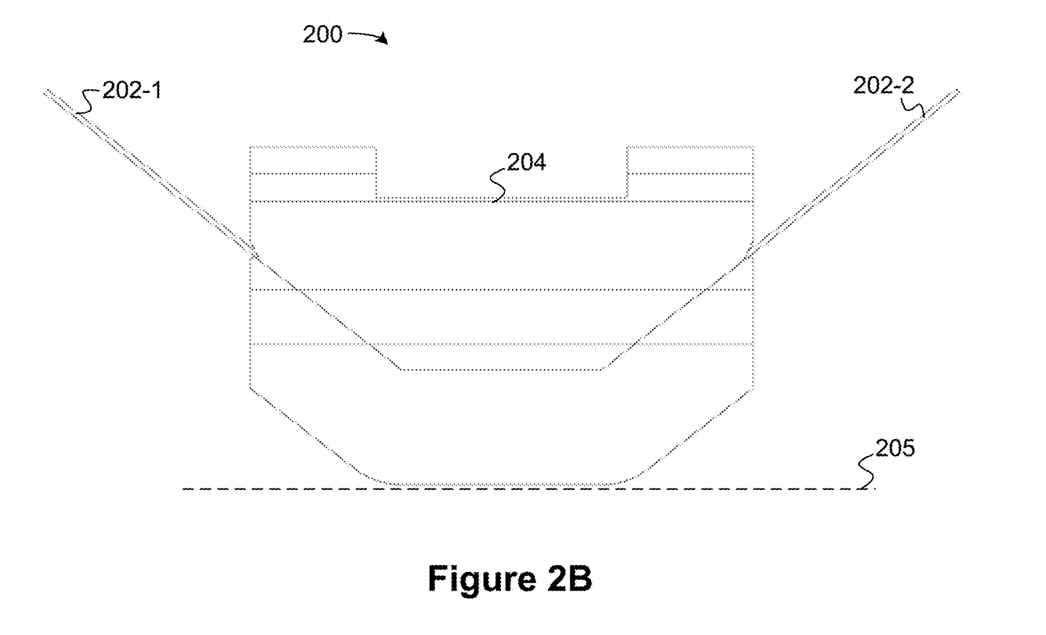

FIGS. 2A-2B illustrate a sensor module 200 in accordance with some embodiments. The sensor module 200 includes piezoelectric stack components 202-1 and 202-2 (sometimes referred to as wing sensors or wing components) and a base component 204. In some embodiments, each piezoelectric stack component 202 includes an elastic support (e.g., a host or substrate material) and one or more piezoelectric sensors (e.g., as described in greater detail with reference to FIGS. 5A-5B). In some embodiments, each piezoelectric stack component 202 may have an angle from a rim baseline 205 in the range of 5 degrees to 45 degrees (e.g., 30 degrees).

In some embodiments, the base component 204 includes an electrical circuit coupled to the piezoelectric stack components 202. In some embodiments, the base component 204 includes one or more fasteners for mounting the sensor module 200 to a rim (e.g., the rim 120). In some embodiments, the base component 204 includes an energy storage device (e.g., a battery or capacitor). In some embodiments, the base component 204 includes an electrical circuit for energy harvesting from the electrical signals provided by the piezoelectric stack components 202.

In some embodiments, the base component 204 includes an electrical circuit for analyzing electrical signals from the piezoelectric stack components 202. In some embodiments, the base component 204 includes control circuitry, such as one or more processors, microprocessors, and/or controllers. In some embodiments, operation of the control circuitry is powered by electrical power from piezoelectric stack components 202. In some embodiments, control circuitry receives electrical power from the energy storage device. In some embodiments, the control circuitry analyzes the electrical signals from the piezoelectric stack components 202 to determine wheel, vehicle, and/or rider analytics, such as forces on the tire, movement of the vehicle, environmental conditions, and road/surface characteristics.

In some embodiments, the base component 204 includes one or more communication interfaces (e.g., wired communication circuit and/or wireless communication circuit) for transmitting signals from the piezoelectric stack components 202 and/or information obtained by analyzing the electrical signals to another wireless communication circuit, e.g., located in another part of the wheel or vehicle, or separate from the vehicle (e.g., a smartphone of the rider).

Figure 3A:
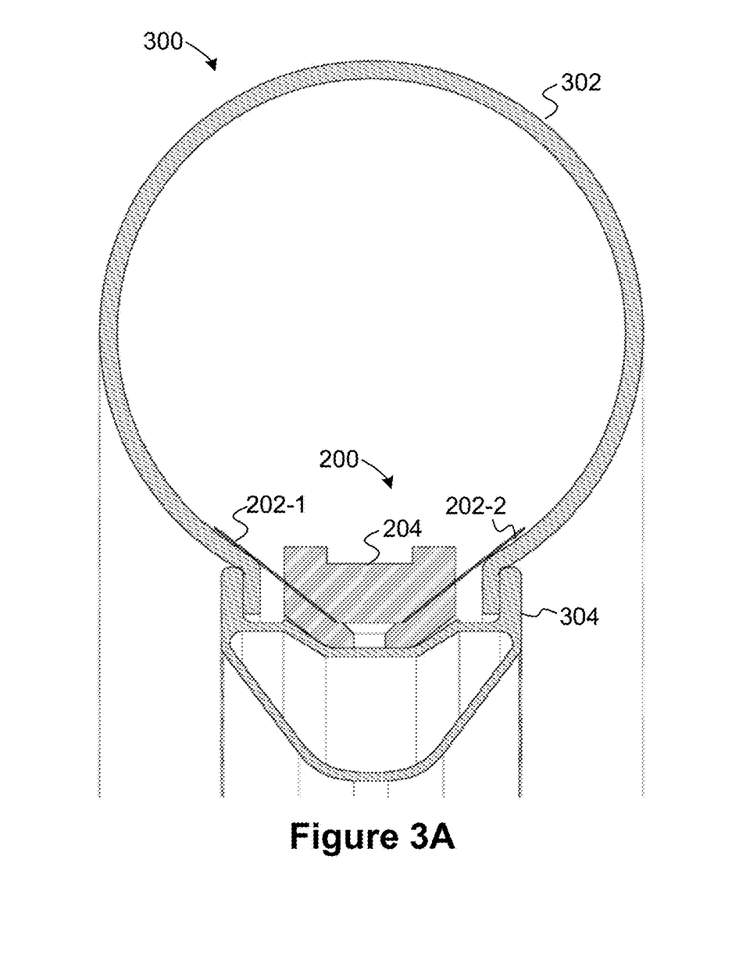
FIGS. 3A-3B illustrate an example wheel with the example sensor module of FIG. 2A in accordance with some embodiments.
Figure 3B:
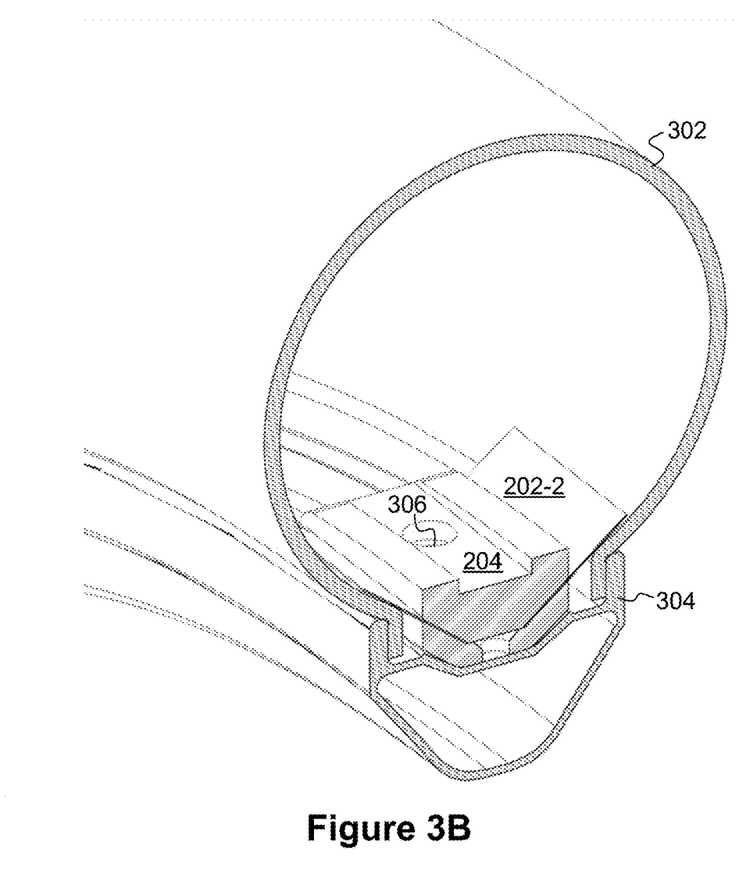

FIGS. 3A-3B illustrate cross-sectional views of the sensor module 200 mounted in a wheel 300 in accordance with some embodiments. In some embodiments, the wheel 300 shown in FIG. 3A corresponds to the wheel 110 shown in FIG. 1B. As shown in FIGS. 3A-3B, the base component 204 of the sensor module 200 is mounted to the rim 304 and the piezoelectric stack components 202 contact the tire 302. In accordance with some embodiments, the base component 204 includes a fastener 306 to affix the base component 204 to the rim 304.

Figure 3C:
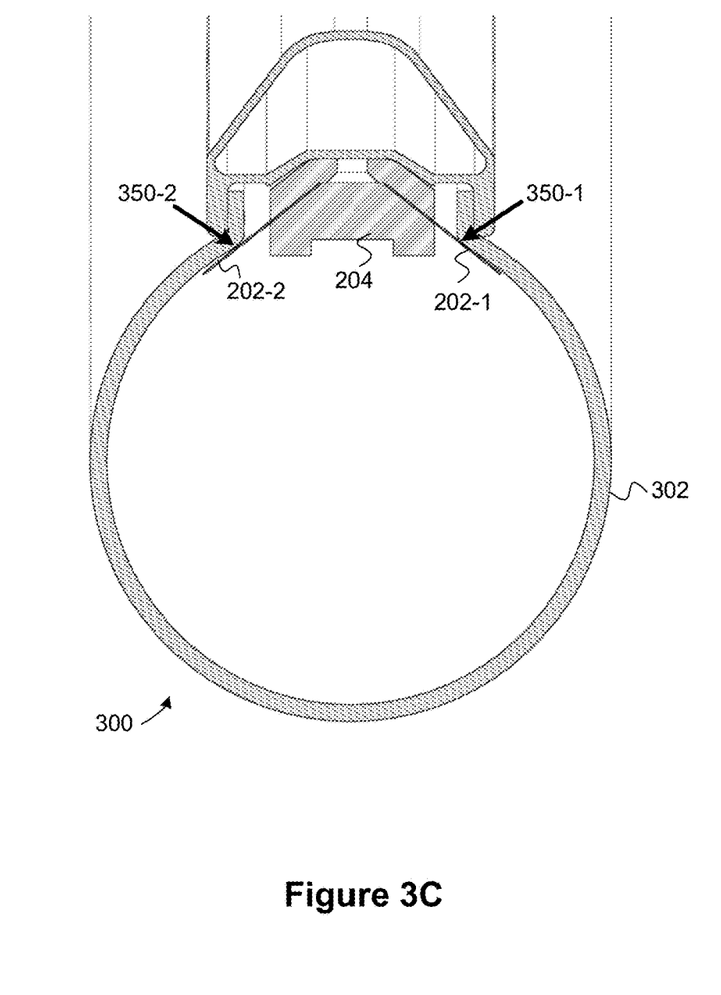
FIGS. 3C-3D illustrate forces applied to the example sensor module of FIG. 2A in accordance with some embodiments.
Figure 3D:
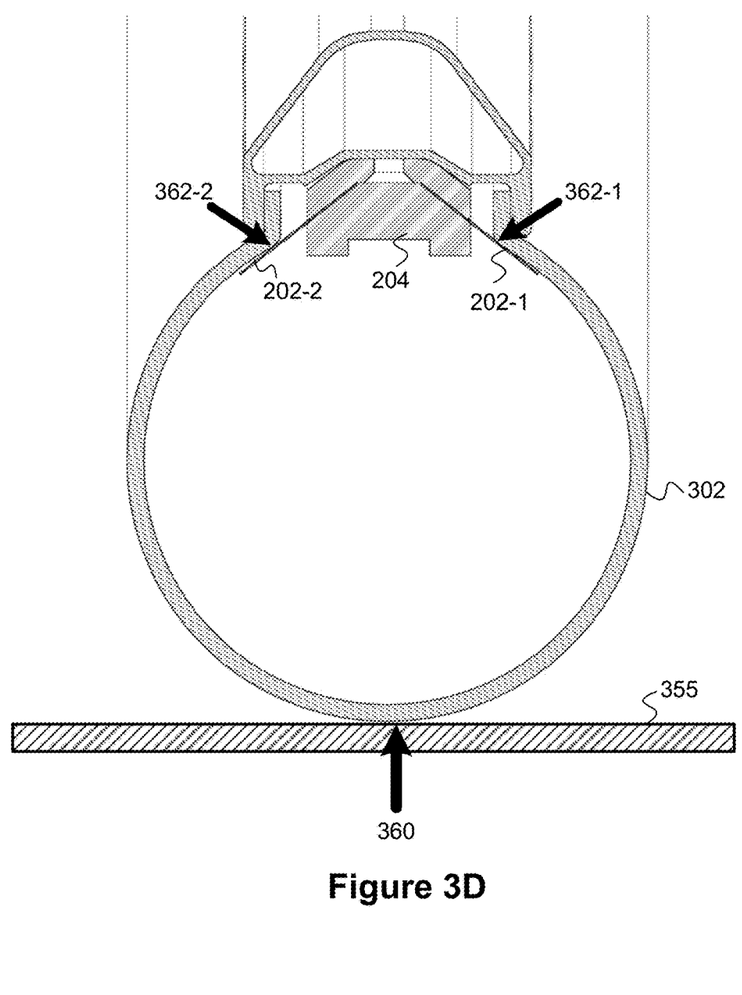

FIGS. 3C-3D illustrate forces applied to the sensor module 200 during operation of the wheel 300 in accordance with some embodiments. FIG. 3C shows the wheel 300 without a surface force applied. Due to inflation of the tire 302, forces 350-1 and 350-2 are applied to the piezoelectric stack components 202 in accordance with some embodiments. In some embodiments, the mechanism of inflating the tire 302 deflects the piezoelectric stack components 202.

FIG. 3D shows the wheel 300 with a surface force 360 applied (due to operation of the vehicle). The surface force 360 deforms the tire 302, which results in the forces 362-1 and 362-2 being applied to the piezoelectric stack components 202. In some configurations and embodiments, the deformation of the tire 302 results in more force being applied to the piezoelectric stack components 202 (causing more strain that translates to an electrical current produced by the piezoelectric sensors). In some configurations and embodiments, the deformation of the tire 302 results in less force being applied to the piezoelectric stack components 202, e.g., due to relaxation of the portion of the sidewalls of the tire 302 in contact with the piezoelectric stack components 202. In accordance with some embodiments, the difference between the force 350-1 and the force 362-1 causes a change in strain of the piezoelectric stack component 202-1, which results in electrical signal generation by piezoelectric sensors in the piezoelectric stack component 202-1. In accordance with some embodiments, the difference between the force 350-2 and the force 362-2 causes a change in strain of the piezoelectric stack component 202-2, which results in electrical signal generation by piezoelectric sensors in the piezoelectric stack component 202-2.

Figure 4A:
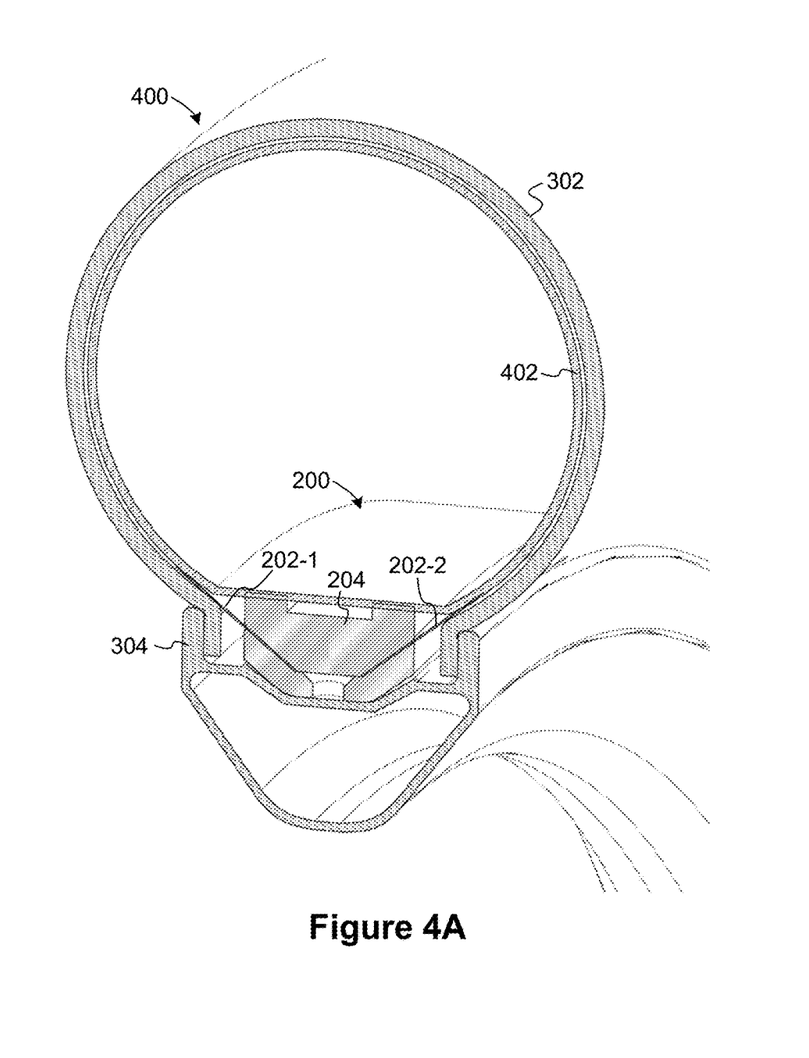
FIGS. 4A-4B illustrate the example sensor module of FIG. 2A mounted in an example wheel with an example inner tube in accordance with some embodiments.
Figure 4B:
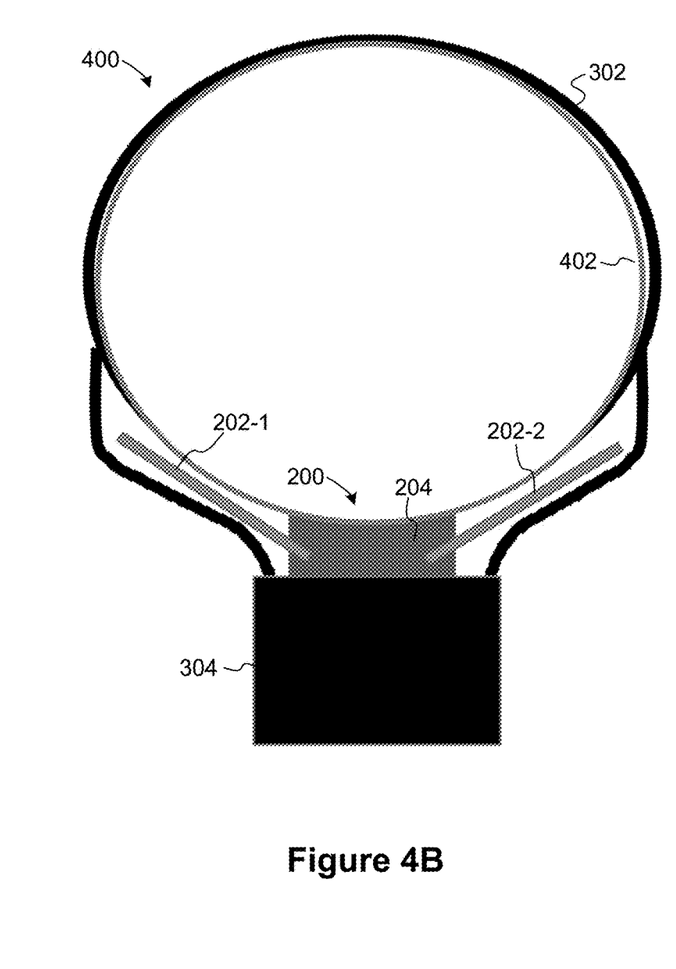

FIGS. 4A-4B illustrate cross-sectional views of the sensor module 200 mounted in a wheel 400 with an inner tube 402 in accordance with some embodiments. In some embodiments, the wheel 400 shown in FIG. 4A corresponds to the wheel 110 shown in FIG. 1B. As shown in FIGS. 4A-4B, the base component 204 of the sensor module 200 is mounted to the rim 304 and the piezoelectric stack components 202 are positioned between the inner tube 402 and the tire 302. In some embodiments, the mechanism of inflating the inner tube 402 deflects the piezoelectric stack components 202.

Figure 4C:
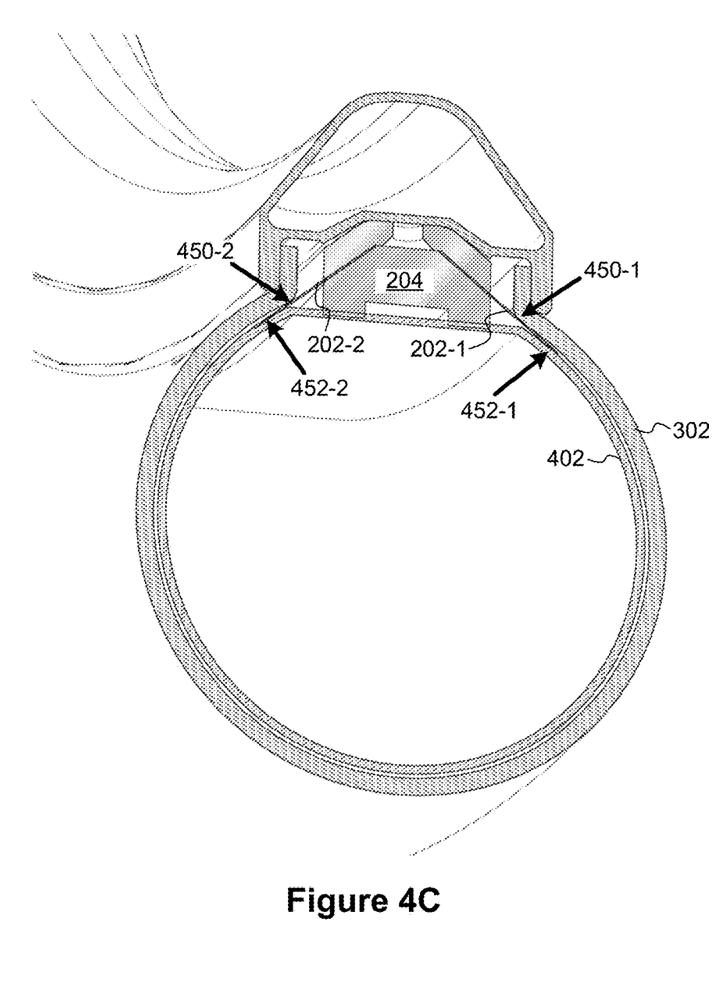
FIGS. 4C-4D illustrate forces applied to the example sensor module of FIG. 2A in accordance with some embodiments.
Figure 4D:
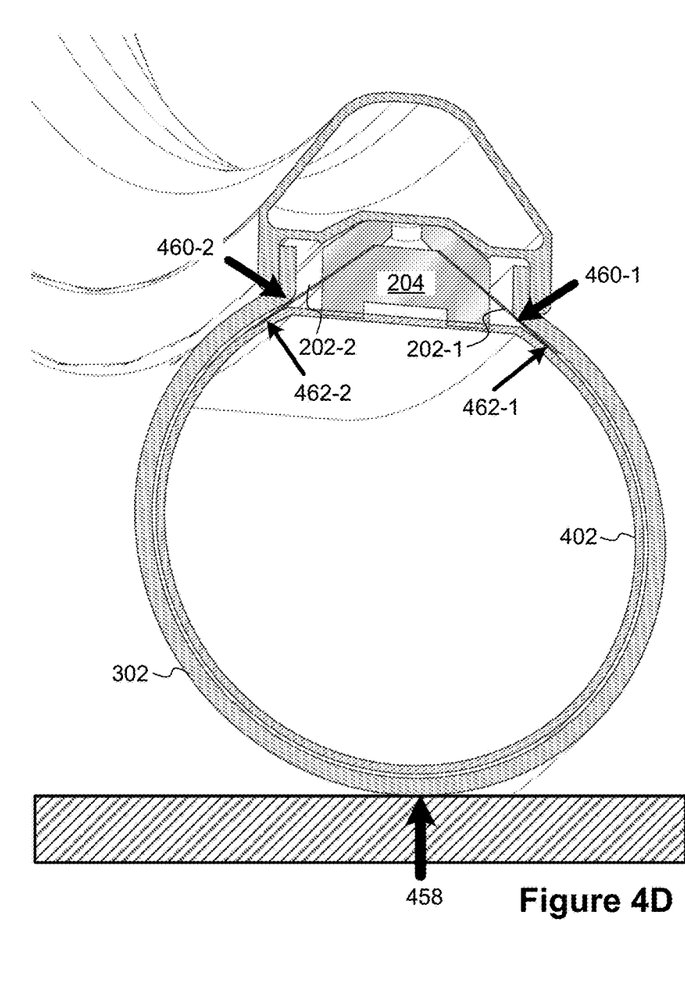

FIGS. 4C-4D illustrate forces applied to the example sensor module of FIG. 2A in accordance with some embodiments. FIG. 4C shows the wheel 400 without a surface force applied. Due to inflation of the inner tube 402, forces 450-1 and 450-2 are applied by the tire 302 to the piezoelectric stack components 202 and the forces 452-1 and 452-2 are applied by the inner tube 402 to the piezoelectric stack components 202 in accordance with some embodiments. In some embodiments, the mechanism of inflating the inner tube 402 deflects the piezoelectric stack components 202. In accordance with some embodiments, the forces 450-1 and 452-1 cause a first strain on the piezoelectric stack component 202-1 and the forces 450-2 and 452-2 cause a first strain on the piezoelectric stack component 202-2.

FIG. 4D shows the wheel 400 with a surface force 458 applied (due to operation of the vehicle). The surface force 458 deforms the tire 302 and the inner tube 402, which results in the forces 460-1 and 462-2 and the forces 462-1 and 462-2 being applied to the piezoelectric stack components 202. In some configurations and embodiments, the deformation causes more force to be applied to the piezoelectric stack components 202 (causing more strain that translates to an electrical current produced by the piezoelectric sensors). In some configurations and embodiments, the deformation causes less force to be applied to the piezoelectric stack components 202. In accordance with some embodiments, the forces 460-1 and 462-1 cause a second strain on the piezoelectric stack component 202-1 and the forces 460-2 and 462-2 cause a second strain on the piezoelectric stack component 202-2.

In accordance with some embodiments, the difference between the first strain and the second strain on the piezoelectric stack components 202-1 and 202-2 results in electrical signal generation by piezoelectric sensors in the piezoelectric stack components 202-1 and 202-2. In some embodiments and circumstances, the presence of the inner tube 402 increases a difference between the first strain and the second strain as compared to embodiments without the inner tube 402 (e.g., as illustrated in FIGS. 3A-3D).

Figure 5A:
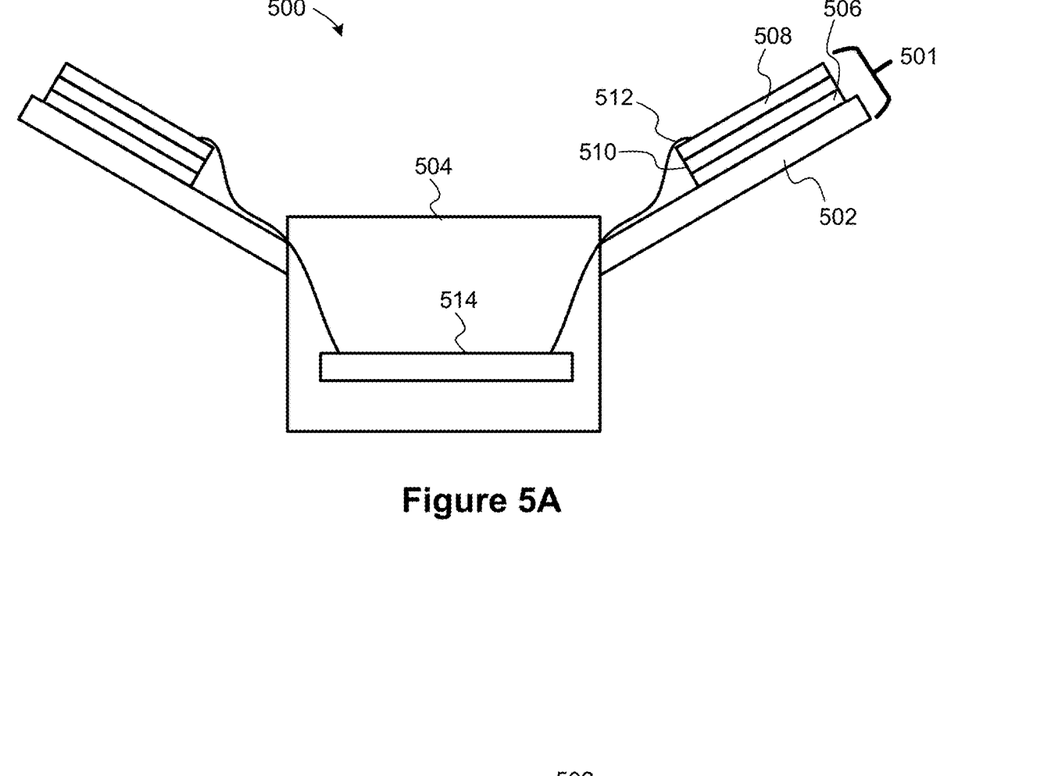
FIGS. 5A-5B illustrate example components of an example sensor module in accordance with some embodiments.

FIG. 5A illustrates a sensor module 500 in accordance with some embodiments. In some embodiments, the sensor module 500 is an instance of the sensor module 200. The sensor module 500 includes a base component 504 housing an electrical component 514 (e.g., a circuit, chip, or FPGA). In some embodiments, the electrical component 514 is, or includes, a power management integrated circuit (PMIC). The sensor module 500 further includes a piezoelectric stack component 501. In accordance with some embodiments, the piezoelectric stack component 501 includes an elastic support 502 (e.g., a host or substrate), an adhesive 506 (e.g., a conductive glue), a piezoelectric sensor 510, an adhesive 508, and a flex circuit 512 that electrically couples the piezoelectric sensor 510 to the electrical component 514.

Figure 5B:
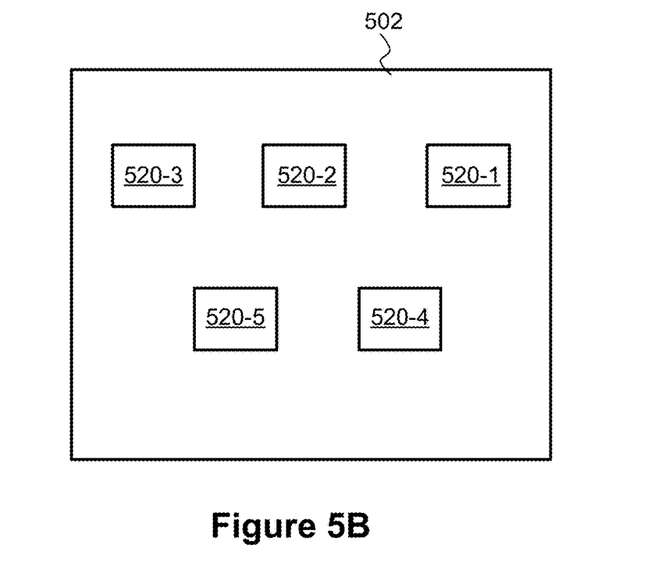

FIG. 5B illustrates an example where the elastic support 502 has multiple piezoelectric sensors 520 mounted thereon (e.g., sensors 520-1, 520-2, 520-3, 520-4, and 520-5). Although FIG. 5B shows the piezoelectric sensors 520 arranged in two rows, other configurations can be used (e.g., a single row, single column, or various diagonal arrangements). Although FIG. 5B shows five piezoelectric sensors 520, other embodiments include more or less sensors (e.g., 1-4 sensors or 6-50 sensors). In some embodiments, the piezoelectric sensors 520 may cover 25%-100% of the surface of the elastic support 502. In some embodiments, the elastic support 502 may have a width in the range of 10-75 millimeters. In some embodiments, the elastic support 502 may have a length in the range of 5-125 millimeters. In some embodiments, the elastic support 502 may have a thickness in the range of 0.1-2 millimeters.

In some embodiments, the length, width, and thickness of the elastic support 502 are selected to obtain desired overloading protection to the piezoelectric sensors 520. In some embodiments, the elastic support 502 has a shape of a strip. In some embodiments, the elastic support 502 has a width that matches the width of the piezoelectric sensor 510. In some embodiments, the elastic support 502 has a width that is greater than the width of the piezoelectric sensor 510. In some embodiments, the width of the elastic support 502 is selected so that the elastic support 502 contacts an inflection point of a tire when installed in a wheel. In some embodiments, the width of the elastic support 502 is selected so that the elastic support 502 contacts one or more portions of an inner surface of the tire 302. In some embodiments, the width of the elastic support 502 is selected based on a rim and/or tire size. In some embodiments, the length of the elastic support 502 is selected so that the elastic support 502 spans a surface contact length of the tire during use.

Examples of elastic support materials for the elastic support 502 include steel, titanium, carbon fiber composition, and carbon steel. In some embodiments, the elastic support 502 may be selected and adapted to have a Young's modulus of at least 0.01 GPa (e.g., to promote transfer of strain from the tire to the piezoelectric sensor 510).

In some embodiments, the flex circuit 512 is replaced (or supplemented) with one or more conductive traces on the elastic support 502. In some embodiments, an additional flex circuit is coupled to the elastic support 502 (e.g., coupled to an underside of the elastic support 502) to complete an electrical circuit between the piezoelectric sensor 510 and the electrical component 514.

In some embodiments, each piezoelectric stack component 501 includes a single layer of piezoelectric material. In some embodiments, each piezoelectric stack component 501 includes two or more layers of piezoelectric material. In some embodiments, the two or more layers of piezoelectric material are separated by one or more (interleaving) layers of an insulating material or a conductive material.

In some embodiments, the piezoelectric sensor 510 is electrically coupled to the electrical component 514 via the flex circuit 512 to provide electrical signals corresponding to strain of the piezoelectric sensor 510. In some embodiments, one or more electrical wires or traces (e.g., connected via pogo pin connector(s)) electrically couple the piezoelectric sensor 510 to the electrical component 514.

In some embodiments, the piezoelectric sensor 510 includes a thin layer of a piezoelectrical material. Examples of piezoelectric materials include gallium nitride, indium nitride, aluminum nitride, zinc oxide, barium titanate, lead zirconate titanate, potassium niobate, sodium tungstate, $Ba_2NaNb_5O_5$, $Pb_2KNb_5O_5$, single crystalline zinc oxide, langasite (La3Ga5SiO14), gallium orthophosphate, lithium niobate, lithium tantalite, sodium potassium niobate, bismuth ferrite, sodium niobate, bismuth titanate, sodium bismuth titanate, quartz, berlinite, topaz, lead titanate, and piezoelectric polymers, such as polyvinylidene fluoride, polyamides, paralyne-C, polyimide, and polyvinylidene chloride. Piezoelectric materials are materials capable of generating electrical charge in response to applied mechanical stress. Thus, when the piezoelectric sensor 510 bends, the piezoelectric material provides charges that are indicative of the amplitude of how much the piezoelectric sensor 510 is bent (e.g., a displacement of a free end of the piezoelectric sensor 510). Similarly, when the piezoelectric sensor 510 vibrates, the piezoelectric material in the piezoelectric sensor 510 provides an (oscillating) electrical signal that corresponds to the vibration of the piezoelectric sensor 510.

The length, width, and thickness of the piezoelectric sensor 510 are selected to obtain a desired performance for sensing and energy harvesting applications. In some embodiments, for use with a bicycle wheel, the length may be selected between 1 mm and 30 mm, between 1 mm and 10 mm, between 5 mm and 15 mm, between 10 mm and 20 mm, between 15 mm and 25 mm, between 20 mm and 30 mm, between 1 mm and 5 mm, between 5 mm and 10 mm, between 10 mm and 15 mm, between 15 mm and 20 mm, between 20 mm and 25 mm, between 25 mm and 30 mm, between 1 mm and 3 mm, between 2 mm and 4 mm, between 3 mm and 5 mm, between 4 mm and 6 mm, between 5 mm and 7 mm, between 6 mm and 8 mm, between 7 mm and 9 mm, or between 8 mm and 10 mm. In some embodiments, for use with a bicycle wheel, the length is approximately 1 mm, approximately 2 mm, approximately 3 mm, approximately 4 mm, approximately 5 mm, approximately 6 mm, approximately 7 mm, approximately 8 mm, approximately 9 mm, approximately 10 mm, approximately 15 mm, approximately 20 mm, approximately 25 mm, or approximately 30 mm. In some embodiments, for use with a bicycle wheel, the width may be selected between 1 mm and 10 mm, between 5 mm and 15 mm, between 10 mm and 20 mm, between 1 mm and 5 mm, between 5 mm and 10 mm, between 10 mm and 15 mm, between 15 mm and 20 mm, between 1 mm and 4 mm, between 2 mm and 5 mm, between 3 mm and 6 mm, between 4 mm and 7 mm, between 5 mm and 8 mm, between 6 mm and 9 mm, or between 7 mm and 10 mm. In some embodiments, for use with a bicycle wheel, the width is approximately 1 mm, approximately 2 mm, approximately 3 mm, approximately 4 mm, approximately 5 mm, approximately 6 mm, approximately 7 mm, approximately 8 mm, approximately 9 mm, approximately 10 mm, approximately 15 mm, or approximately 20 mm. In some embodiments, for use with a bicycle wheel, the thickness of the piezoelectric sensor 510 may be 10 $\mu$m, 20 $\mu$m, 30 $\mu$m, 40 $\mu$m, 50 $\mu$m, 60 $\mu$m, 70 $\mu$m, 80 $\mu$m, 90 $\mu$m, 100 $\mu$m, 200 $\mu$m, 300 $\mu$m, 400 $\mu$m, 500 $\mu$m, 600 $\mu$m, 700 $\mu$m, 800 $\mu$m, 900 $\mu$m, 1 mm, 2 mm, 3 mm, 4 mm, 5 mm, or within a range between any two of the aforementioned values. In some embodiments, the thickness of the piezoelectric sensor 510 is approximately 100 $\mu$m, approximately 200 $\mu$m, approximately 300 $\mu$m, approximately 400 $\mu$m, approximately 500 $\mu$m, approximately 600 $\mu$m, approximately 1 mm, approximately 2 mm, approximately 3 mm, approximately 4 mm, or approximately 5 mm. For wheels of different sizes, the piezoelectric sensor may have any other length, width, and thickness. As used herein, the term "approximately" means within 10% of the target value.

The elastic support 502 is made of an elastic material. In some embodiments, the elastic support 502 is composed of steel (e.g., carbon steel and spring steel), titanium, and/or a composite material (e.g., carbon composite, such as carbon-fiber-reinforced polymers).

Figure 6A:
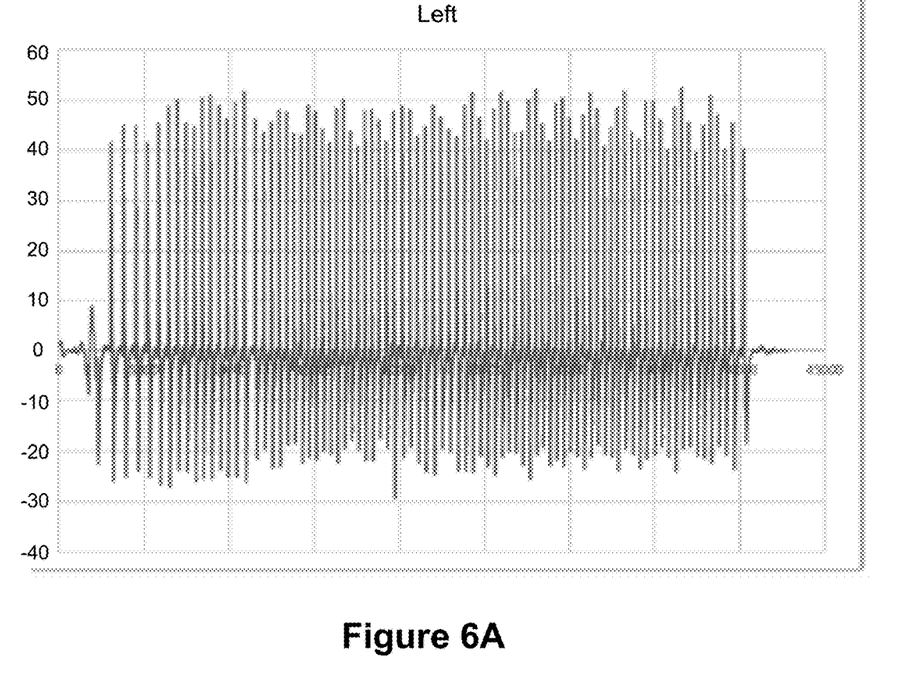
FIGS. 6A-6B are plots showing energy sensing pulses generated from an example sensor module in accordance with some embodiments.
Figure 6B:
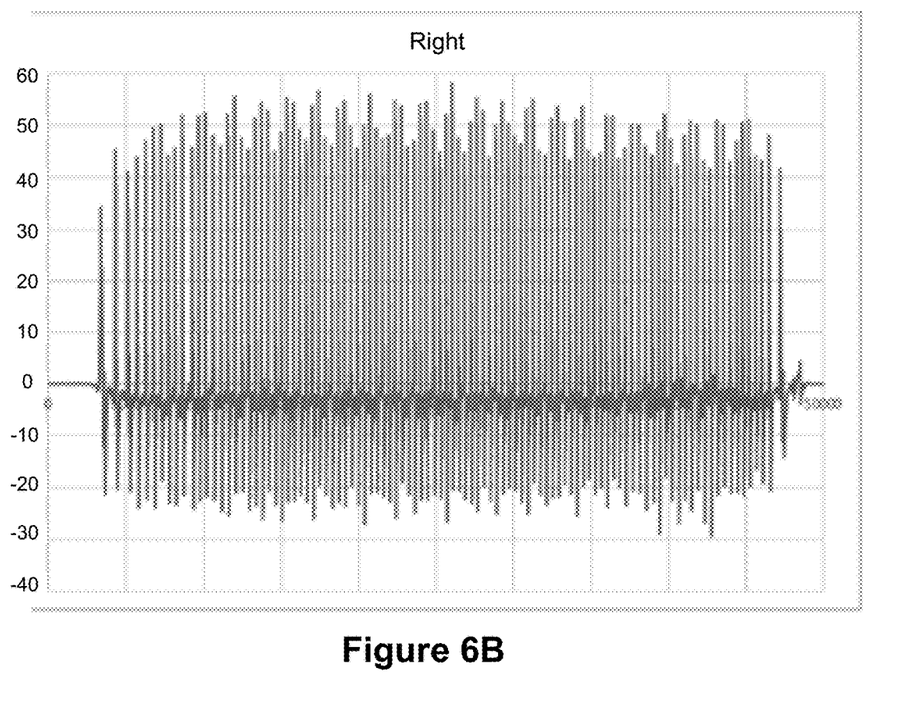

FIGS. 6A-6B are plots showing energy sensing pulses generated from the sensor module 200 in accordance with some embodiments. FIG. 6A shows energy sensing pulses generated by a piezoelectric sensor on a left side of a tire (e.g., with pulses between 50 volts and −25 volts) during a surface contact test. FIG. 6B shows energy sensing pulses generated by a piezoelectric sensor on a right side of the tire during the surface contact test (e.g., with pulses between 50 volts and −25 volts). In some embodiments, the energy sensing pulses are analyzed (e.g., at the electric component 514) to determine various analytics, such as tire pressure, direction, speed, and force. In some embodiments, the energy sensing pulses generated by the left sensor are combined/compared with the energy sensing pulses generated by the right sensor to obtain differential signals for use with determining the analytics.

Figure 6C:
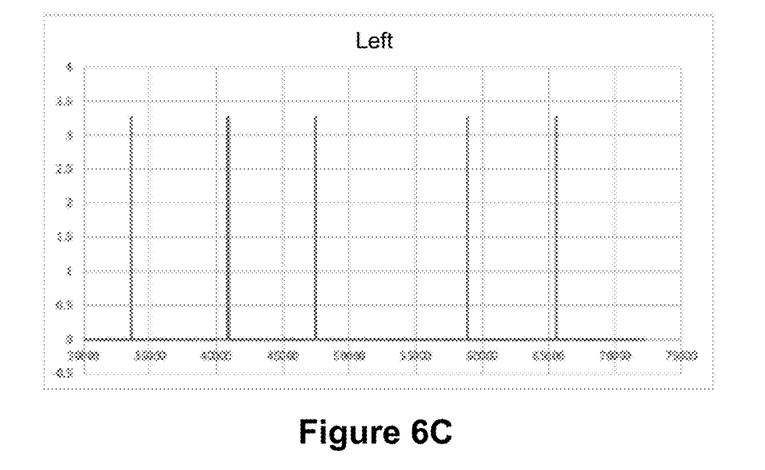
FIGS. 6C-6E are plots showing energy harvesting pulses generated from an example sensor module in accordance with some embodiments.
Figure 6D:
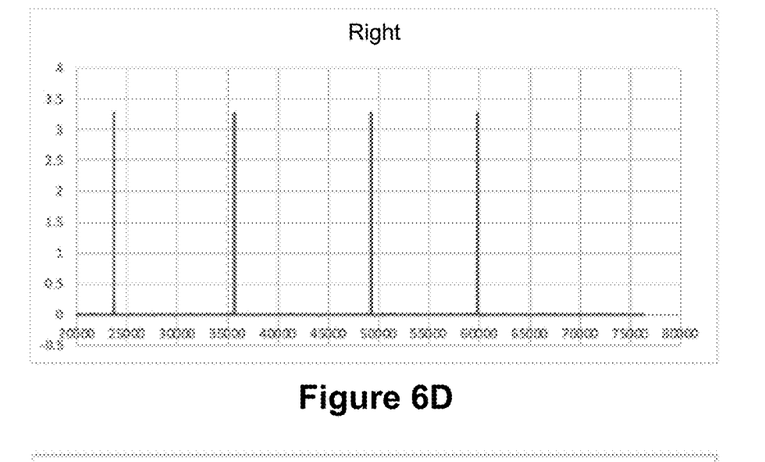
Figure 6E:
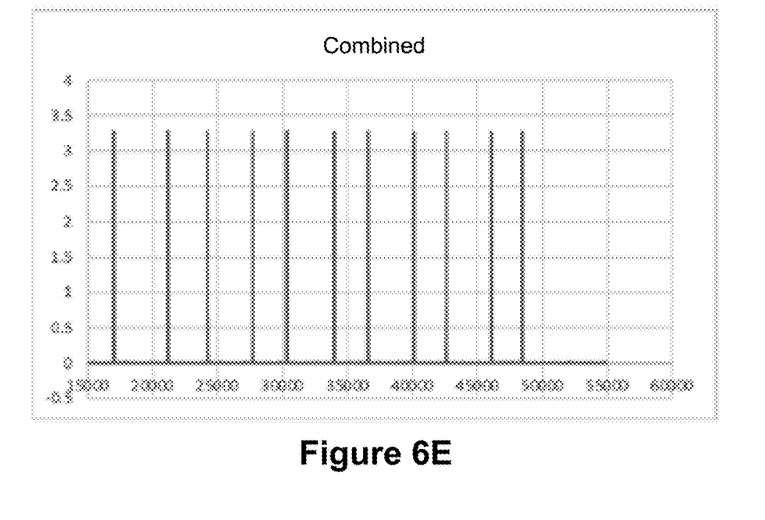

FIGS. 6C-6E are plots showing energy harvesting pulses generated from an example sensor module in accordance with some embodiments. FIG. 6C shows energy harvesting pulses generated by a piezoelectric sensor on a left side of a tire (e.g., 3.3 volt pulses) during a surface contact test. FIG. 6D shows energy harvesting pulses generated by a piezoelectric sensor on a right side of the tire during the surface contact test (e.g., 3.3 volt pulses). FIG. 6E shows the combined energy harvesting pulses from the left and right piezoelectric sensors on a right side of the tire during the surface contact test (e.g., 3.3 volt pulses). In some circumstances and embodiments, the left and right piezoelectric sensors are coupled together and excited in-phase to double energy output.

Figure 7:
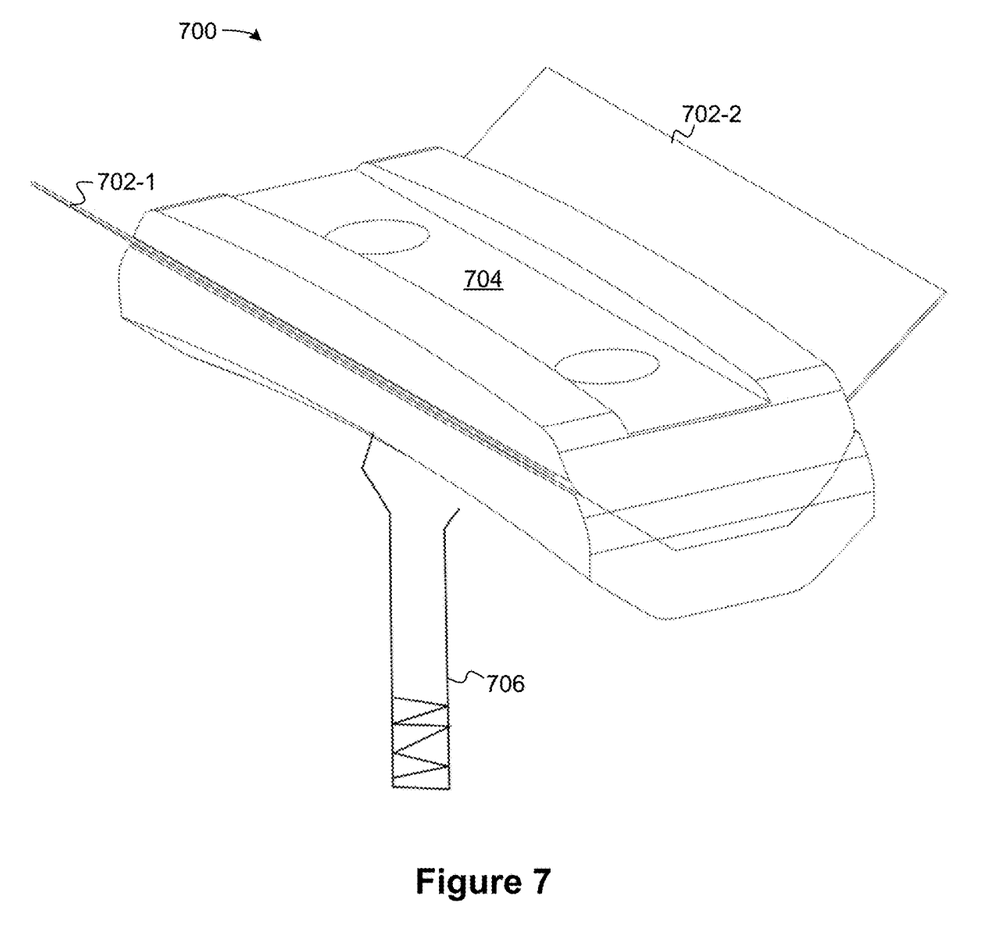
FIG. 7 illustrates an example sensor module with an integrated stem in accordance with some embodiments.

FIG. 7 illustrates a sensor module 700 with an integrated stem 706 in accordance with some embodiments. The sensor module 700 includes the base component 704 and piezoelectric stack components 702-1 and 702-2. The sensor module 700 further includes the integrated stem 706. The sensor module 700 is adapted to replace a conventional stem for a tubeless tire (e.g., as shown in FIG. 3A-3B), e.g., the sensor module 700 is configured to mount over a stem hole in the rim 304.

Figure 8:
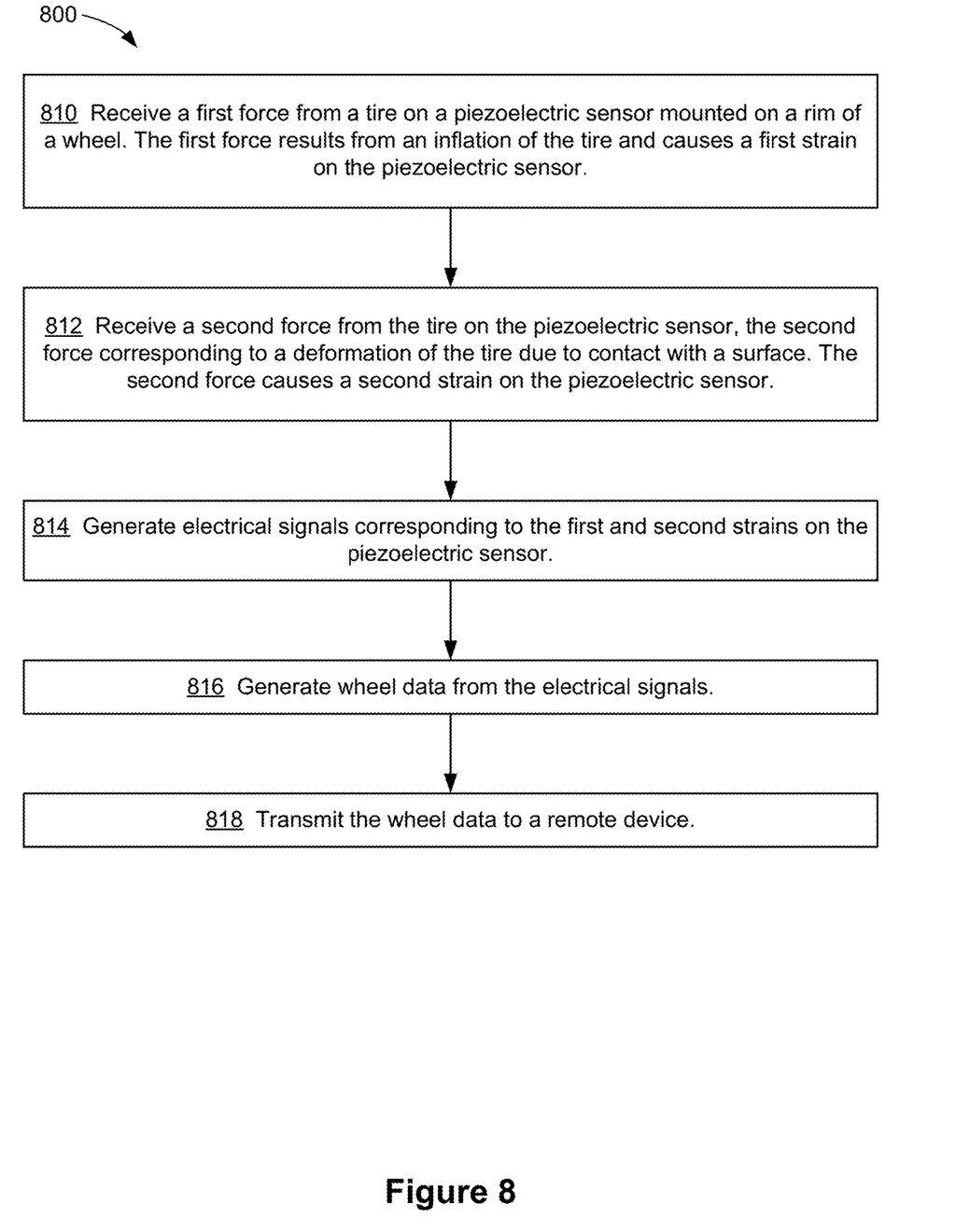
FIG. 8 is a flow diagram illustrating a method of generating wheel data in accordance with some embodiments.

FIG. 8 is a flow diagram illustrating a method 800 of generating wheel data in accordance with some embodiments. The method 800 includes (810) receiving a first force (e.g., the force 350-1 in FIG. 3C) from a tire (e.g., the tire 302) on a piezoelectric sensor (e.g., the piezoelectric stack component 202-1) mounted on a rim (e.g., the rim 304) of a wheel. The first force results from an inflation of the tire 302 and causes a first strain on the piezoelectric sensor (e.g., sensor 510). For example, the tire is in contact with an elastic support (e.g., the elastic support 502) with one or more piezoelectric sensors coupled thereon (e.g., the piezoelectric sensors 520).

The method 800 includes (812) receiving a second force from the tire on the piezoelectric sensor (e.g., the force 362-1 in FIG. 3D), the second force corresponding to a deformation of the tire due to contact with a surface (e.g., the surface 355). The second force causes a second strain on the piezoelectric sensor. In some embodiments, the second force is greater than the first force (e.g., due to surface contact causing deflection of the sidewalls of the tire).

The method 800 includes generating (814) electrical signals (e.g., as illustrated in FIG. 6A) corresponding to the first and second strains on the piezoelectric sensor. For example, the piezoelectric sensor generates electrical signals that correspond to changes in strain applied to the sensor.

The method 800 includes generating (816) wheel data from the electrical signals. In some embodiments, generating the wheel data includes obtaining differential data from piezoelectric sensors on opposing sides of the tire (e.g., to discriminate force bias). In some embodiments, the wheel data includes one or more of: tire behavior, pressure, direction, and speed, temperature, and applied forces. In some embodiments, the method 900 includes determining a driving condition of the wheel based on the electrical signals.

The method 800 includes transmitting (818) the wheel data to a remote device (e.g., a smartphone of the user). In some embodiments, the sensor module (e.g., sensor module 200) is communicatively coupled to the remote device via a wired or wireless connection. In some embodiments, the remote device is a component of, or mounted to, the wheel or the vehicle to which the wheel is attached. In some embodiments, the sensor module is coupled to the remote device via Bluetooth, Zigbee, or WiFi protocol.

In light of these examples and principles explained herein, we now turn to certain embodiments.

(A1) In one aspect, some embodiments include a sensor module for a wheel (e.g., the sensor module 200). The sensor module includes: (i) a base module (e.g., the base component 204) mountable to a rim (e.g., the rim 304) of the wheel; (ii) a first set of piezoelectric sensors (e.g., the piezoelectric stack component 202-1) coupled to the base module at a first side; and (iii) a second set of piezoelectric sensors (e.g., the piezoelectric stack component 202-2) coupled to the base module at a second side, the second side opposite of the first side. For example, the sensors are configured to measure a force applied to the wheel via deformations of a tire on the wheel. In some embodiments, the first and second sets of piezoelectric sensors are in-phase with one another. In some embodiments, the first set piezoelectric sensors includes at least one piezoelectric sensor in contact with a tire. In some embodiments, the first set piezoelectric sensors includes at least one piezoelectric sensor in contact with an inner tube.

(A2) In some embodiments of A1, the first set of piezoelectric sensors are positioned to contact an inside tire of the wheel at a first side, and the second set of piezoelectric sensors are positioned to contact the inside tire at a second side, the second side opposite the first side (e.g., as illustrated in FIG. 3A). For example, a force applied to the tire results in a force at each of the first and second sets of piezoelectric sensors.

(A3) In some embodiments of A1 or A2, the base module includes an electrical circuit (e.g., the electrical component 514) electrically coupled to the first and second sets of piezoelectric sensors. In some embodiments, the electrical circuit is configured to transition to a low-power mode when the wheel is not in use (e.g., not rotating). For example, the electrical circuit transitions to the low-power mode in accordance with the piezoelectric sensors not transmitting electrical signals (in response to changes in strain) for at least a preset amount of time. In some embodiments, the low-power mode preserves energy storage at the sensor module. In some embodiments, the electrical circuit is configured to transition from the low-power mode to an operating mode in accordance with the wheel being in use (e.g., detecting a change in strain applied to a piezoelectric sensor).

(A4) In some embodiments of A3, the electrical circuit is configured to determine a force differential between the first set of piezoelectric sensors and the second set of piezoelectric sensors. In some embodiments, the electrical circuit is configured to measure an individual force, a differential force, and/or a parallel force (e.g., based on a mode set for the sensor module).

(A5) In some embodiments of A3 or A4, the electrical circuit is configured to selectively transition between an energy harvesting mode and a sensing mode. In some embodiments, the electrical circuit operates in a preset cycle that includes both energy harvesting and sensing. In some embodiments, individual piezoelectric sensors transition between sensing and energy harvesting. In some embodiments, a first subset of piezoelectric sensors are configured for sensing and a second subset of piezoelectric sensors are configured for energy harvesting.

(A6) In some embodiments of any of A3-A5: (i) the first set of piezoelectric sensors are attached to an elastic support (e.g., the elastic support 502); (ii) the elastic support is connected to the base module; and (iii) the electrical circuit is electrically coupled to the first set of piezoelectric sensors (e.g., via one or more traces on the elastic support and one or more spring-loaded pins). In some embodiments, the electrical circuit is electrically coupled to the first set of piezoelectric sensors via one or more flex circuits (e.g., the flex circuit 512). In some embodiments: (i) the second set of piezoelectric sensors are attached to an elastic support (e.g., the elastic support 502); (ii) the elastic support is connected to the base module; and (iii) the electrical circuit is electrically coupled to the second set of piezoelectric sensors. In some embodiments, the electrical circuit is electrically coupled to the second set of piezoelectric sensors via one or more flex circuits (e.g., the flex circuit 512).

(A7) In some embodiments of any of A1-A6, the base module includes a wireless transmitter configured to transmit sensor data to a remote device. For example, the remote device is a mobile device of the user or a vehicle controller. In some embodiments, the base module is configured to determine and transmit analytics such as tire behavior, pressure, direction, force and speed to the remote device.

(A8) In some embodiments of any of A1-A7, the base module includes a third set of sensors. For example, the third set of sensors include a sensor configured to determine an air pressure within a tire of the wheel (e.g., the third set of sensors are sensors other than piezoelectric sensors). For example, the third set of sensors include one or more: temperature sensors, air pressure sensors, GPS sensors, gyrometers, light sensors, and the like.

(A9) In some embodiments of any of A1-A8, the base module includes an energy harvesting circuit configured to harvest energy from the first and second sets of piezoelectric sensors. In some embodiments, the energy harvesting circuit includes one or more capacitors and one or more regulators (e.g., buck converters).

(A10) In some embodiments of A9, the sensor module further includes an energy storage element, where the energy harvesting circuit is configured to transfer electrical charge to the energy storage element. In some embodiments, the energy harvesting circuit is configured to transfer electrical charge to one or more electrical components that are distinct from the sensor module (e.g., a light mounted to the wheel).

(A11) In some embodiments of any of A1-A10, the sensor module further includes an elastic support (e.g., the elastic support 502) coupled to the base module and adapted to contact a tire mounted on the wheel, where the first set of piezoelectric sensors is attached to the elastic support (e.g., via the adhesive 506). In some embodiments, the elastic support is composed of carbon fiber composite or carbon steel. In some embodiments, the first set of piezoelectric sensors are attached to the elastic support via an adhesive (e.g., a conductive glue). In some embodiments, the elastic support is composed of a material having a Young's modulus of at least 0.01 gigapascal (GPa).

(A12) In some embodiments of A11, the elastic support has a linear shape (e.g., as illustrated in FIG. 2A).

(A13) In some embodiments of A11, the elastic support has a concave shape. In some embodiments, the elastic support has a shape that matches or conforms to a tire curve for the wheel.

(A14) In some embodiments of any of A1-A13, the elastic support has a length that corresponds to a contact length of the tire during use.

(A15) In some embodiments of any of A1-A14, the sensor module further includes a flexible circuit (e.g., the flexible circuit 512) electrically coupling the first set of piezoelectric sensors to a controller (e.g., a controller of the electrical component 514) positioned in the base module.

(A16) In some embodiments of any of A1-A15, the sensor module further includes an inflation stem (e.g., the stem 706) for the wheel, the inflation stem integrated with the base module.

(B1) In another aspect, some embodiments include a wheel comprising a rim (e.g., the rim 304) and the sensor module of any of A1-A16.

(B2) In some embodiments of B1, the wheel further includes a tire (e.g., the tire 302) and an inner tube (e.g., the inner tube 402), where the first set of piezoelectric sensors are positioned between the tire and the inner tube (e.g., as illustrated in FIG. 4B).

(C1) In another aspect, some embodiments include a method (e.g., the method 800) that includes: (i) receiving a first force from a tire on a piezoelectric sensor mounted on a rim of a wheel (e.g., as illustrated in FIG. 3C), the first force resulting from an inflation of the tire and causing a first strain on the piezoelectric sensor; (ii) receiving a second force from the tire on the piezoelectric sensor (e.g., as illustrated in FIG. 3D), the second force corresponding to a deformation of the tire due to contact with a surface, where the second force causes a second strain on the piezoelectric sensor; (iii) generating electrical signals (e.g., at the piezoelectric sensor) corresponding to differences between the first and second strains on the piezoelectric sensor; (iv) generating wheel data (e.g., at the electrical component 514) from the electrical signals; and (v) transmitting (e.g., via the electrical component 514) the wheel data to a remote device. For example, the electrical signals correspond to a changes in strain applied to the piezoelectric sensors due to the first and second forces.

(C2) In some embodiments of C1, the wheel is mounted on a vehicle (e.g., a bicycle or e-bike), and the second force is generated from a weight of the vehicle being applied to the surface via the tire.

(C3) In some embodiments of C1 or C2, the second force is greater than the first force and the second strain is greater than the first strain. For example, deflection of the tire due to weight of the vehicle increases the amount of force applied to the piezoelectric sensor. In some embodiments, the piezoelectric sensor is arranged within the inner tire such that the second force is less than the first force, e.g., deflection of the tire due to weight of the vehicle reduces the amount of force applied to the piezoelectric sensor.

In accordance with some embodiments, a sensor module mountable adjacent to a rim of a wheel includes a first set of piezoelectric sensors (e.g., the piezoelectric stack component 202-2 in FIG. 2A); and a first elastic support (e.g., the elastic support 502 in FIG. 5A) with the first set of piezoelectric sensors coupled thereon so that the first set of piezoelectric sensors are spaced apart from the rim of the wheel (e.g., in FIG. 3A, the piezoelectric stack component 202-1 is not in contact with, and is spaced apart from, the rim 304).

In some embodiments, the sensor module includes a base (e.g., the base component 204 in FIG. 2A) onto which the first elastic support is coupled. In some embodiments, the first elastic support has a first end and a second end that is opposite to the first end and the first end is rigidly coupled with the base. For example, in FIG. 3A a first end of the piezoelectric stack component 202 is rigidly coupled to the base component 204 and a distal end is in contact with the tire 302. In some embodiments, the first elastic support has a first end and a second end that is opposite to the first end; and the first end is rotatably coupled with the base. In some embodiments, the base component includes an electrical circuit electrically coupled with the first set of one or more piezoelectric sensors.

In some embodiments, the first elastic support includes an inner surface and an outer surface that is opposite to the inner surface; and the first set of piezoelectric sensors include at least one piezoelectric sensor mounted on the inner surface (e.g., see FIG. 5A). In some embodiments, the first elastic support of the sensor module has a point or line contact with the inside tire. In some embodiments, the first elastic support of the sensor module has a plane contact with the first elastic support.

In some embodiments, the sensor module includes a second set of piezoelectric sensors; and a second elastic support with the second set of piezoelectric sensors coupled thereon so that the second set of piezoelectric sensors are spaced apart from the rim of the wheel (e.g., the piezoelectric stack component 202-1 in FIG. 2A). In some embodiments, the first set of piezoelectric sensors includes at least one piezoelectric sensor in contact with the inner tube.

It will be understood that, although the terms first, second, etc. may be used herein to describe various elements, these elements should not be limited by these terms. These terms are only used to distinguish one element from another. For example, a first end could be termed a second end, and, similarly, a second end could be termed a first end, without departing from the scope of the various described embodiments. The first end and the second end are both ends, but they are not the same end. Similarly, a first elastic support could be termed a second elastic support, and, similarly, a second elastic support could be termed a first elastic support, without departing from the scope of the various described embodiments. The first elastic support and the second elastic support are both elastic supports, but they are not the same elastic support.

The terminology used in the description of the embodiments herein is for the purpose of describing particular embodiments only and is not intended to be limiting of the scope of claims. As used in the description and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The foregoing description, for purpose of explanation, has been described with reference to specific embodiments. However, the illustrative discussions above are not intended to be exhaustive or to limit the scope of claims to the precise forms disclosed. Many modifications and variations are possible in view of the above teachings. The embodiments were chosen and described in order to best explain the principles of the various described embodiments and their practical applications, to thereby enable others skilled in the art to best utilize the principles and the various described embodiments with various modifications as are suited to the particular use contemplated.

What is claimed is:

1. A sensor module for a wheel, the sensor module comprising:
   a base module mountable to a rim of the wheel;
   a first set of piezoelectric sensors coupled to the base module and positioned to be in contact with a first interior side of a tire of the wheel in the absence of deformation of the tire; and
   a second set of piezoelectric sensors coupled to the base module and positioned to be in contact with a second interior side of the tire of the wheel, the second interior side opposite of the first interior side.

2. The sensor module of claim 1, wherein the base module includes a wireless transmitter configured to transmit sensor data to a remote device.

3. The sensor module of claim 1, further comprising an inflation stem for the wheel, the inflation stem integrated with the base module.

4. The sensor module of claim 1, wherein inflation of the tire causes the first interior side to apply a force to the first set of piezoelectric sensors.

5. The sensor module of claim 1, wherein the base module includes an electrical circuit electrically coupled to the first and second sets of piezoelectric sensors.

6. The sensor module of claim 5, wherein the electrical circuit is configured to determine a force differential between the first set of piezoelectric sensors and the second set of piezoelectric sensors.

7. The sensor module of claim 5, wherein the electrical circuit is configured to selectively transition between an energy harvesting mode and a sensing mode.

8. The sensor module of claim 5, wherein:
   the first set of piezoelectric sensors are attached to an elastic support;
   the elastic support is connected to the base module; and
   the electrical circuit is electrically coupled to the first set of piezoelectric sensors via one or more traces on the elastic support and one or more spring-loaded pins.

9. The sensor module of claim 8, wherein:
   the second set of piezoelectric sensors are attached to a second elastic support;
   the second elastic support is connected to the base module; and
   the electrical circuit is electrically coupled to the second set of piezoelectric sensors.

10. The sensor module of claim 1, wherein the base module includes an energy harvesting circuit configured to harvest energy from the first and second sets of piezoelectric sensors.

11. The sensor module of claim 10, further comprising an energy storage element, wherein the energy harvesting circuit is configured to transfer electrical charge to the energy storage element.

12. The sensor module of claim 1, further comprising an elastic support coupled to the base module and adapted to contact the tire mounted on the wheel, wherein the first set of piezoelectric sensors is attached to the elastic support.

13. The sensor module of claim 12, wherein the elastic support has a linear shape or a concave shape.

14. The sensor module of claim 12, further comprising a flexible circuit electrically coupling the first set of piezoelectric sensors to a controller positioned in the base module.

15. The sensor module of claim 12, wherein the elastic support has a length that corresponds to a contact length of the tire during use.

16. A wheel, comprising:
   a rim; and
   the sensor module of claim 1.

17. The wheel of claim 16, further comprising a tire and an inner tube, wherein the first set of piezoelectric sensors are positioned between the tire and the inner tube.

18. A method, comprising:
   receiving a first force from a tire on a piezoelectric sensor mounted on a rim of a wheel, the first force resulting from an inflation of the tire and causing a first strain on the piezoelectric sensor;
   receiving a second force from the tire on the piezoelectric sensor, the second force corresponding to a deformation of the tire due to contact with a surface, wherein the second force causes a second strain on the piezoelectric sensor;
   generating an electrical signal corresponding to a difference between the first and second strains on the piezoelectric sensor;
   generating wheel data based on the electrical signal; and
   transmitting the wheel data to a remote device.

19. The method of claim 18, wherein the wheel is mounted on a vehicle, and wherein the second force is generated from a weight of the vehicle being applied to the surface via the tire.

20. The method of claim 18, wherein the second force is greater than the first force and the second strain is greater than the first strain.

* * * * *